United States Patent [19]

Kassai

[11] Patent Number: 4,546,995
[45] Date of Patent: Oct. 15, 1985

[54] COLLAPSIBLE LUGGAGE CARRIER

[75] Inventor: Kenzou Kassai, Osaka, Japan

[73] Assignee: Kassai Kabushikikaisha, Osaka, Japan

[21] Appl. No.: 558,186

[22] Filed: Dec. 5, 1983

[30] Foreign Application Priority Data

Dec. 18, 1982 [JP] Japan .................................. 57-191979

[51] Int. Cl.⁴ .............................................. B62B 1/00
[52] U.S. Cl. .................................. 280/655; 280/47.29
[58] Field of Search ...................... 280/655, 652, 47.29, 280/47.27, 47.24, 47.17, 638, 639

[56] References Cited

U.S. PATENT DOCUMENTS 3,998,476  12/1976  Kazmark ............................ 280/655
4,299,403  11/1981  Brewer ............................... 280/655

Primary Examiner—Richard A. Bertsch
Attorney, Agent, or Firm—W. G. Fasse; D. H. Kane, Jr.

[57] ABSTRACT

A handcart has a pair of handle bars (3) extending upwardly from opposite sides of a baggage support (1) having wheels (2). The handle bars are extensible. Each handle bar (3) comprises a lower bar (5) and an upper bar (6) which are telescopically put together. The slide movement between the lower and upper bars (5, 6) is selectively inhibited by engaging pins which in the fully extended state of the handle bars (3), engage respective pawls (18). The engaging pins (17) can be disengaged by treading on a treadle (15), whereby the length of handle bars (3) can be reduced.

10 Claims, 10 Drawing Figures

FIG.4
FIG.5
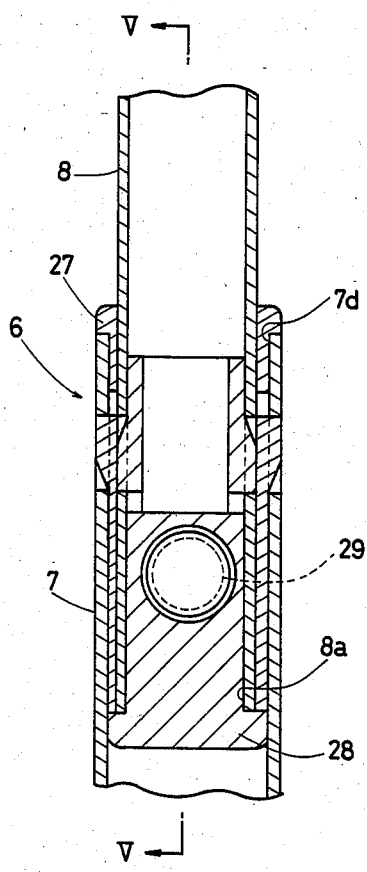
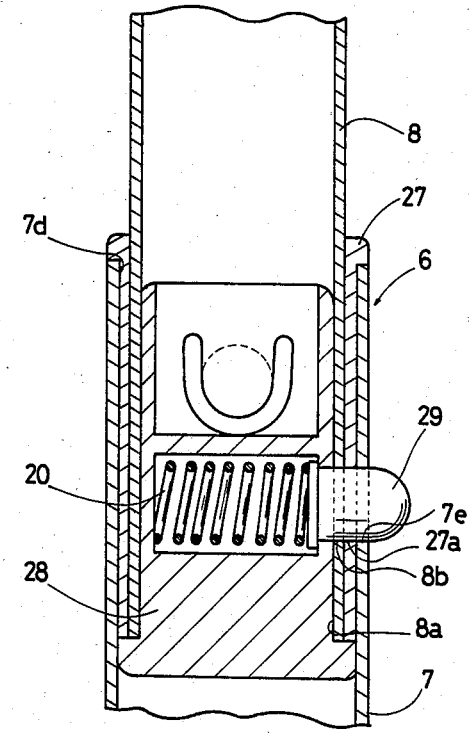

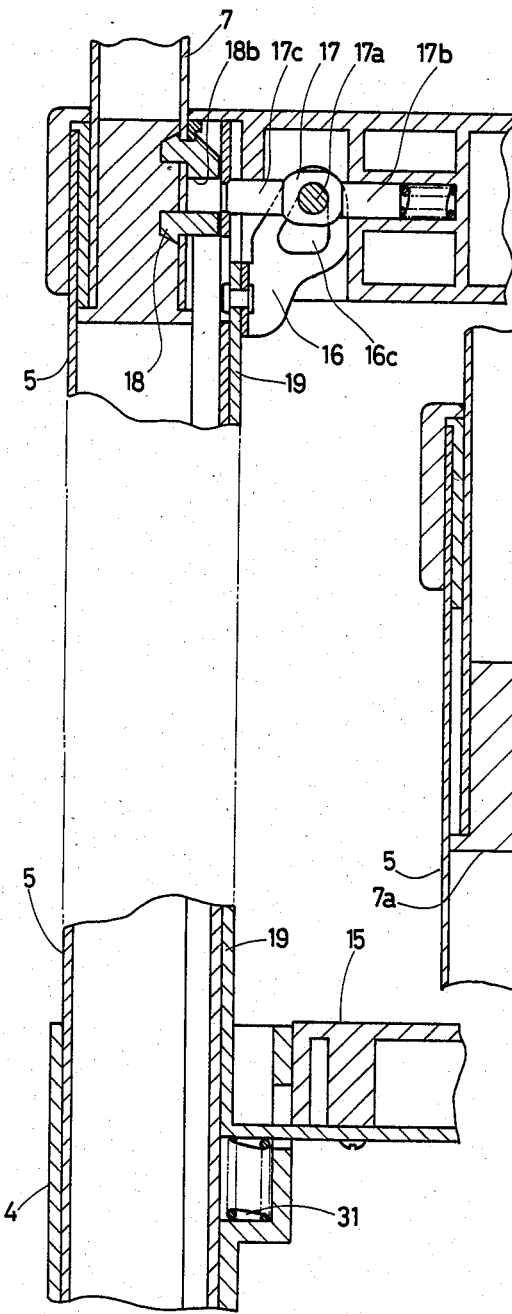
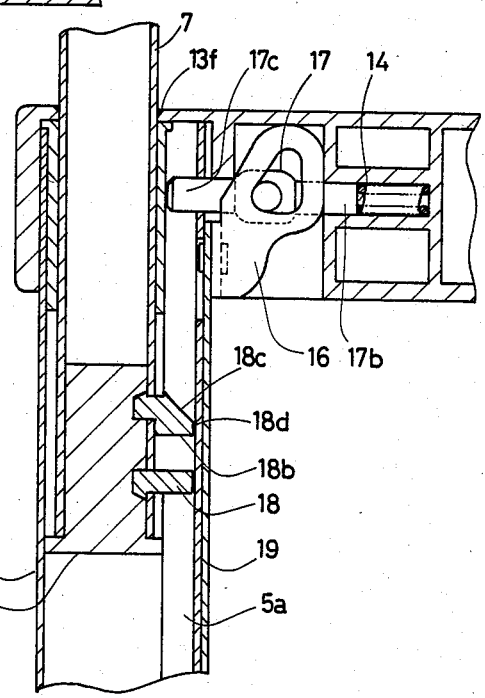
FIG. 8
FIG. 9

COLLAPSIBLE LUGGAGE CARRIER

BACKGROUND OF THE INVENTION

1. Field of the Invention

This invention relates to a handcart and particularly to an extensible construction for handle bars provided on a handcart.

2. Description of the Prior Art

Generally, handcarts are often used when heavy baggage is transported during shopping or a trip or when baggage is moved from one place to another for transport at traffic stations. Such handcarts usually have relatively long handle bars, so that gripping the handle bars by hand, the operator will steer the handcart while tilting the latter. The relatively long handle bars make it possible to reduce the load on the operator and the force required to turn the handcart to a different direction by means of the handle bars.

However, such long handle bars have the drawback of increasing the bulk of the handcart and the space occupied by the handcart when it is not used. Therefore, it is desirable that the handle bars of the handcart should be reduced in length as needed.

SUMMARY OF THE INVENTION

Accordingly, a principal object of this invention is to provide a construction whereby relatively long handle bars provided on a handcart can be extended and contracted as needed.

Another object of this invention is to provide a construction whereby handle bars can be extended and contracted in a simple operation.

A handcart according to this invention is provided with a baggage support having wheels, and right and left handle bars are attached to opposite sides of said baggage support. Each handle bar is extensible. That is, each handle bar comprises a lower bar and an upper bar longitudinally slidable and having a portion partly overlapping said lower bar, the slide movement between said lower and upper bars making it possible to extend or contract the handle bar. Each handle bar is provided with engaging means for selectively inhibiting the slide movement between the lower and upper bars in the fully extended state of the handle bar. This engaging means is positioned at the upper end portion of the lower bar where the lower bar overlaps the lower end portion of the upper bar in said fully extended state. Spring means is provided for imparting an engaging motion to the engaging means. Operating means is provided for imparting a disengaging motion to the engaging means against the force of the spring means, said operating means being positioned adjacent the lower end of the lower bar. Thus, the operating means is positioned so that it can be operated by foot, enabling the operator, while standing, to operate said operating means. The movement of the operating means is transmitted to said engaging means through interlocking means.

In a preferred embodiment of the invention, each lower bar is formed of a pipe which slidably receives the associated upper bar in a telescoping manner. The engaging means comprises, in combination, an engaging pin adapted to come in and out of the lower bar through a throughgoing hole formed in the lateral wall of the upper end portion of the lower bar, and a pawl positioned at the lower end portion of each upper bar and engageable with said engaging pin. The operating means is preferably in the form of a single treadle disposed between the lower end portions of the lower bars. The treadle is movable longitudinally of the lower bars, i.e., substantially vertically. The aforesaid interlocking means comprises a connecting member fixed to an end of this treadle and extending along the lower bar from the lower to the upper end of said lower bar, and a guide member adapted to bring the engaging pin outside the lower bar in response to the downward movement of the treadle while engaging the engaging pin.

These objects and other objects, features, aspects and advantages of the present invention will become more apparent from the following detailed description of the present invention when taken in conjucntion with the accompanying drawings.

BRIEF DESCRIPTION OF THE DRAWINGS

FIG. 4 is an enlarged sectional view taken along the line IV—IV of FIG. 2;

FIG. 5 is a sectional view taken along the line V—V of FIG. 4;

FIGS. 8 and 9 show a portion corresponding to that shown in FIG. 6, illustrating different phases of operation.

DESCRIPTION OF THE PREFERRED EMBODIMENTS

Figure 1:
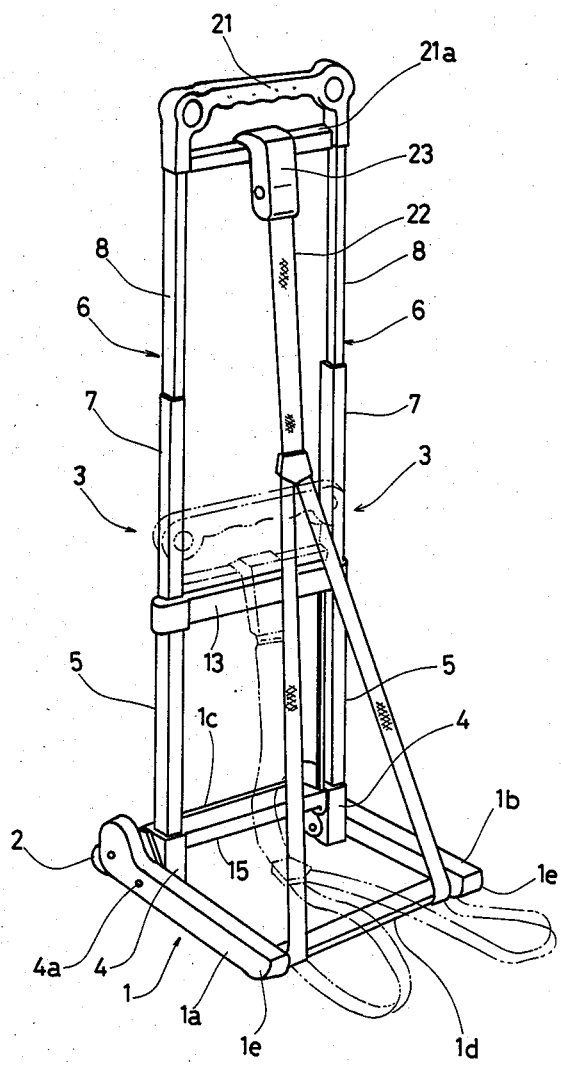
FIG. 1 is a perspective view of an embodiment of this invention.
Figure 2:
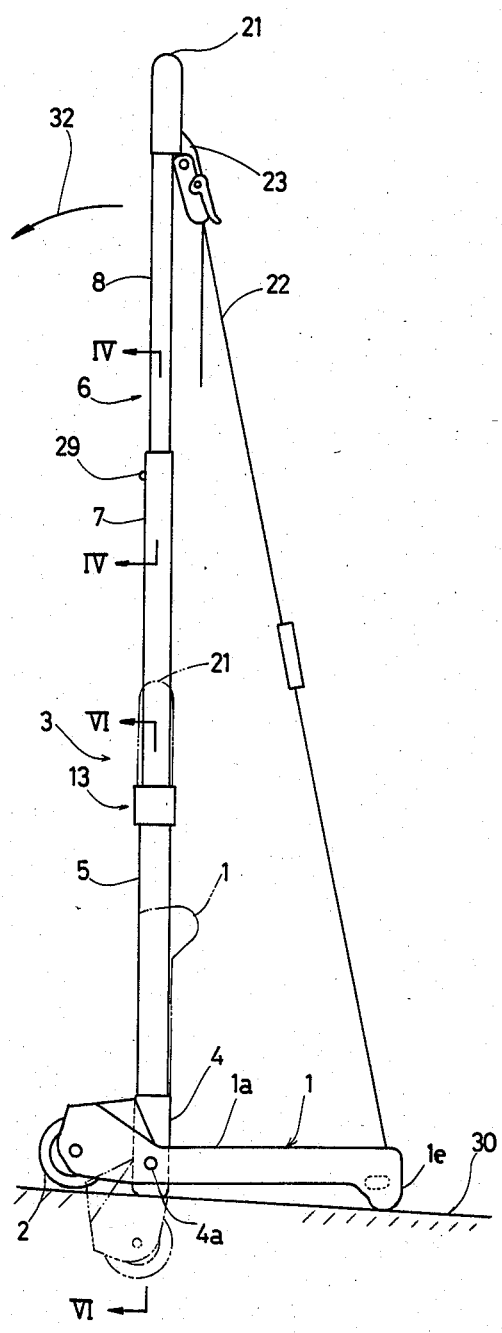
FIG. 2 is a side view of the handcart shown in FIG. 1.
Figure 3:
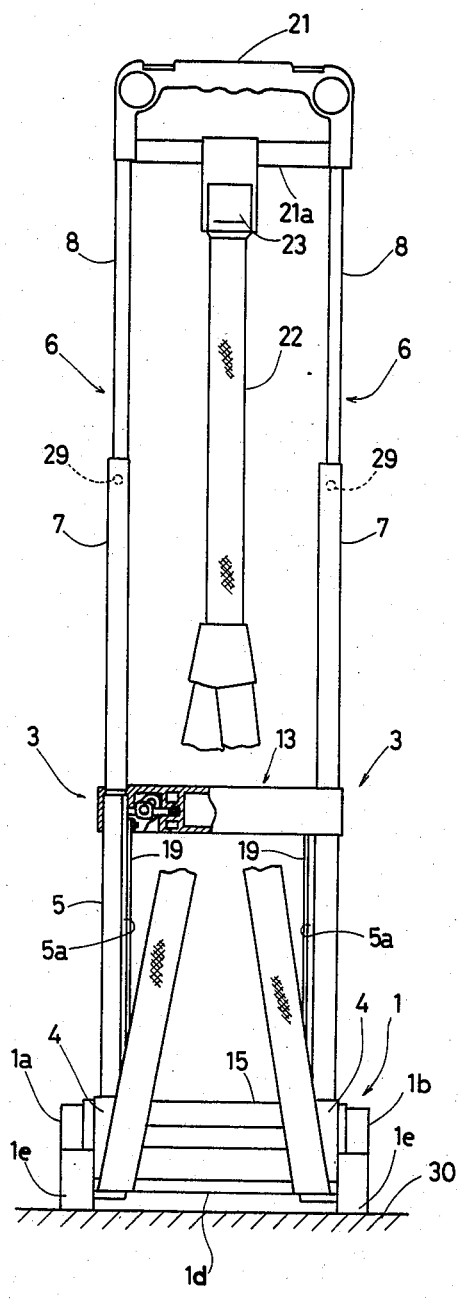
FIG. 3 is a front view of the handcart of FIG. 1.

Referring to FIGS. 1 to 3, the present handcart has a baggage support 1 with wheels 2 rotatably attached thereto. A pair of handle bars 3 is attached to and extends upwardly from opposite sides of the baggage support 1. Thus, according to the operating method to be described below, the handle bars 3 can be reduced in length as shown in phantom lines in FIGS. 1 and 2, and the baggage support 1 can be folded to extend along the handle bars 3, as shown in phantom lines in FIG. 2. In addition, the components of this handcart are symmetrically arranged on opposite sides.

As shown in FIG. 1, the baggage support 1 comprises left and right longitudinal frames 1a and 1b, and front and rear transverse frames 1c and 1d connecting the front and rear portions of said longitudinal frames 1a and 1b. The wheels 2 are attached to the front ends of the left and right longitudinal frames 1a and 1b. The rear ends of the left and right longitudinal frames 1a and 1b are formed with downwardly projecting ground-engaging portions 1e.

At the front portions of the left and right longitudinal frames 1a and 1b, pipe ends 4 attached to the lower ends of the handle bars 3 are respectively supported by rotary shafts 4a. The handle bars 3 and the baggage support 1 are inhibited from having their angle further opened because the front transverse frame 1c abuts against the pipe ends 4; thus, they are held perpendicular to each other, as shown in FIGS. 1 to 3.

Figure 7:
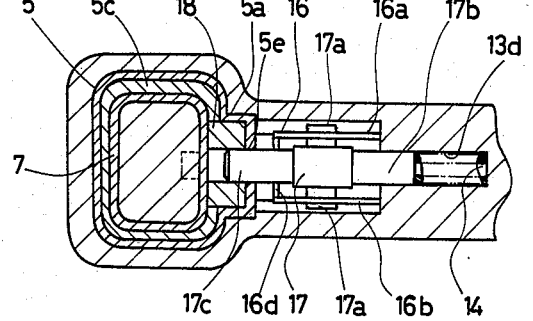
FIG. 7 is a sectional view taken along the line VII—VII of FIG. 6.

Each handle bar 3 comprises a lower bar 5 and an upper bar 6. The lower bar 5 is formed of a pipe section adapted to slidably receive the upper bar 6 in a telescopic manner. The cross-sectional shape of the lower bar 5 is best shown in FIG. 7, being a T-shape having a bulge 5a on one side thereof. The bulge 5a extends longitudinally of the lower bar 5, as shown in FIG. 3.

Each upper bar 6 preferably comprises a plurality of pipes which are telescopically put together. In the illustrated embodiment, the upper bar 6 comprises a lower pipe section 7 and an upper pipe section 8, the latter being inserted from above into the former.

Referring to FIGS. 4 and 5, the lower end opening 8a in the upper pipe section 8 has a pipe end 28 inserted and fixed therein. A compression spring 20 is housed in a space definded in the pipe end 28, and an engaging pin 29 is held in the pipe end 28 in such a manner that it is outwardly urged by the action of the compression spring 20. The engaging pin 29 projects out of a throughgoing hole 8b formed in the upper pipe section 8 and is arranged so that when a throughgoing hole 27a in a sleeve 27 fixed to the upper end of the lower pipe section 7 and a throughgoing hole 7e in the lower pipe section 7 are aligned with the throughgoing hole 8b of the upper pipe section 8, the engaging pin 29 projects outwardly of the throughgoing hole 7e, whereby the lower and upper pipe sections 7 and 8 are held in the fully extended state.

Referring again to FIGS. 1 to 3, a handle 21 is fixed between the upper ends of the pair of upper pipe sections 8. A belt fixing member 21a is attached to the handle 21 in the lower region thereof. An inverted Y-shaped belt 22 is provided for fixing baggage (not shown) on the baggage support 1. The upper end of the belt 22 is attached to a belt hanger 23 which holds the belt 22 while adjusting the length of the belt 22. The lower ends of the belt 22 are fixed to the rear transverse frame 1d of the baggage support 1.

Figure 6:
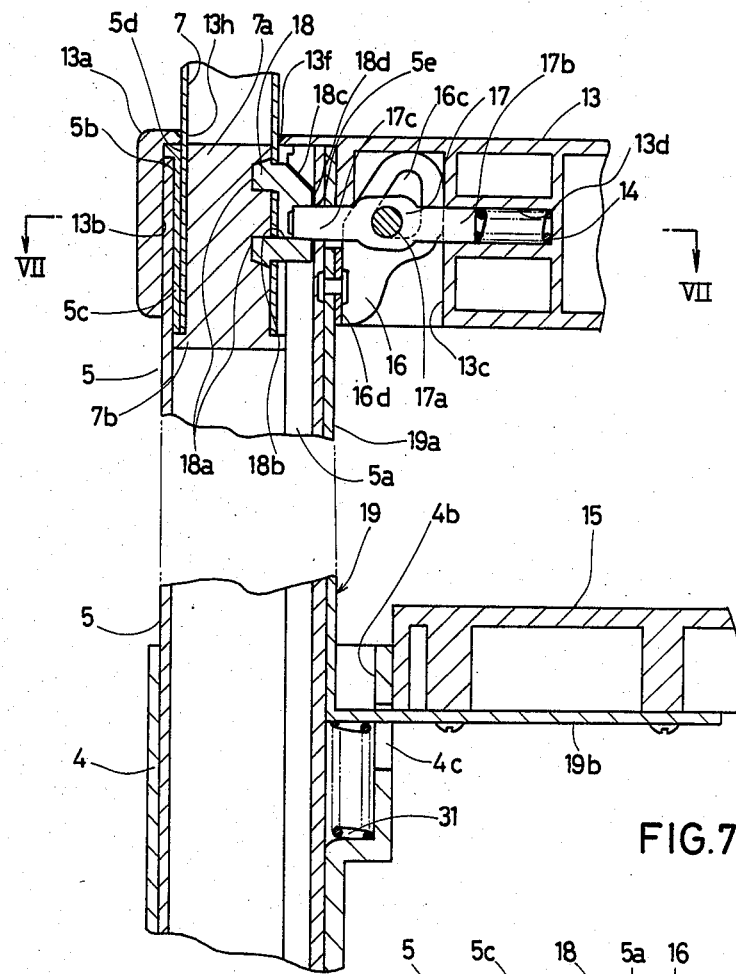
FIG. 6 is an enlarged sectional view taken along the line VI—VI of FIG. 2.

Referring to FIGS. 6 and 7, a guide bushing 5c of approximately rectangular cross-section is force-fitted in the upper end opening 5b in the lower bar 5. The guide bushing 5c is fixed to the lower bar 5 with the lower surface of its flange 5d contacting the upper end surface of the lower bar 5. A transverse bar 13 shown in its entirety in FIGS. 1 and 3 is connected between the upper ends of the pair of lower bars 5. The transverse bar 13 is of substantially quadrilateral cross-section and has a fixing portion 13a integrally formed on each end thereof. The fixing portion 13a has an upper end opening 13h for slidably receiving the lower pipe section 7 from above and a fitting opening 13b for receiving the upper end of the lower bar from below to hold the transverse bar 13 with respect to the lower bar 5. The peripheral edge of the upper end opening 13h has an inclined guide surface 13f such that it becomes gradually lower in level toward the center, as will become apparent from the description set forth below.

A recess 13c having an open bottom is formed adjacent the inner side of the fixing portion 13a of the transverse bar 13. The right-hand side wall of the recess 13c as viewed in FIGS. 6 and 7 has a guide hole 13d. The left-hand side wall of the recess 13c as viewed in FIGS. 6 and 7 has approximately its lower half cut away.

A guide member 16 formed by bending a metal sheet into a U-shape is housed in the recess 13c. The guide member 16 is vertically movable, as will become apparent from the following description. The guide member 16 has two lateral walls 16a and 16b (FIG. 7). Each lateral wall has a triangular guide hole 16c. As best shown in FIG. 6, the guide hole 16c has a side extending from the upper right to the lower left as viewed in this figure.

An engaging pin 17 is positioned between the two lateral walls 16a and 16b. The engaging pin has round shaft-like support portions 17a, which are received in the aforesaid guide holes 16c. Further, the engaging pin 17 has a guide portion 17b, which is slidably received in the aforesaid guide hole 13d. The side of the engaging pin opposite to the guide portion 17b has an engaging portion 17c. The engaging portion 17c is capable of projecting into the lower bar 5 through said cut-away portion of the recess 13c and then through the throughgoing hole 5e in the lateral wall of the upper end portion of the lower bar 5. A spring 14 is housed in the guide hole 13d for biasing the the engaging portion 17c of the pin 17 into the lower bar 5.

As shown in FIGS. 1 and 3, a treadle 15 is disposed between the pipe ends 4 provided at the lower ends of the pair of lower bars 5. The treadle 15, as shown in detail in FIG. 6, has fixed thereto as by screws the transverse side 19b of a connecting member 19 which has an L-shape. The transverse side 19b is received in an elongated opening 4c in the lateral wall of a spring holding portion 4b extending from the pipe end 4 and is vertically movable within the range defined by the elongated opening 4c. Therefore, the treadle 15 is vertically movable as the transverse side 19b of the connecting member 19 is moved. A compression spring 31 is housed in said spring holding portion 4b for constantly urging the treadle upward through the connecting member 19. The vertical side 19a of the connecting member 19 extends along the outer side of the bulge 5a of the lower bar 5 and has its upper end fixed to the connecting wall 16d of the aforesaid guide member 16 as by rivets. In this manner, ultimately the vertical movement of the treadle 15 is operatively associated with the vertical movement of the guide members 16.

As shown in FIGS. 6 and 7, the lower pipe section 7 of the upper bar 6 is vertically slidably inserted in the guide bushing 5c inserted in the upper end opening 5b in the lower bar 5. A pipe end 2a is inserted in the lower end of the lower pipe section 7. The lower end portion of the pipe end 7a has an outwardly projecting flange 7b. When the lower pipe section 7 is pulled up to its upper end position, the flange 7b abuts against the lower end surface of the guide bushing 5c, thereby preventing the lower pipe section 7 from slipping out of the lower bar 5.

Further, as shown in FIGS. 6 and 7, the lower end portion of the lower pipe section 7 is provided with a pawl 18. The pawl 18 is fixed to the lower pipe section 7, because its fixing portion 18a penetrates into the pipe end 7a through the lower pipe section 7. The vertical surface of the front end of the pawl 18 has an engaging hole 18b having an inner diameter slightly larger than the outer diameter of the engaging portion 17c of the aforesaid engaging pin 17. Further, the upper surface of the projecting portion of the pawl 18 has an inclined guide surface 18c sloping downwardly from the upper left to the lower right as viewed in FIG. 6.

The operation of the handcart in the aforesaid embodiment will now be described.

The state shown in solid lines in FIGS. 1, 2 and 3 is the normal working state of the handcart when the latter is placed on a floor surface 30.

In this state, the front transverse frame 1c of the baggage support 1 abuts against the pipe ends 4, whereby the baggage support 1 and the handle bars 3 are held perpendicular to each other, being prevented from further turning in the opening direction away from each other. In this state, the ground-engaging portions 1e of the baggage support 1 and the lower ends of the pipe ends 4 are in contact with the floor surface 30, with the wheels 2 raised from the floor surface 30, so that the entire handcart is somewhat tilted forward (to the left as viewed in FIG. 2).

Further, the engaging pins 29 of the upper pipe sections 8 have engaged the throughgoing holes 7e and 27e of the lower pipe sections 7 and sleeves 27, while the engaging portions 17c of the engaging pins 17 have engaged the engaging holes 18b of the pawls 18 fixed to the lower pipe sections 7, as shown in FIG. 6. In this manner the handle bars 3 are held in their fully extended state.

When baggage (not shown) is to be transported with the handcart in this state, the baggage is placed on the baggage support 1, tying the same with the belt 22, gripping the handle 21, tilting the handle bars 3 forward, i.e., in the direction of arrow 32 in FIG. 2 to bring the wheels 2 into contact with the ground 30, and forwardly pulling or backwardly pushing the handcart.

When the handcart is not needed for transporting baggage and when it is desired to store the handcart in compact form, the handle bars 3 can be reduced in length. That is, first, the treadle 15 is depressed by stepping on the treadle 15 to move the members 19 connected to said treadle 15 against the resiliency of the compression springs 31. In response thereto, the guide members 16 attached to the upper ends of the connecting members 19 are moved downwardly. At this time, the guide hole 16c of the guide member 16 pushes the support portion 17a of the engaging pin 17 by its inclined side, whereby the engaging pin 17 is moved to the right as viewed in FIG. 6 against the resiliency of the spring 14. As a result, the engaging portion 17c of the engaging pin 17 escapes from the engaging hole 18b of the pawl 18 to assume the state shown in FIG. 8.

In the FIG. 8 state, the handle 21 (FIGS. 1 to 3) is pushed down, whereby the lower pipe section 7 is moved downwardly in the lower bar 5 (FIG. 9). At this time, the pawl 18 is guided along the inner side of the bulge 5a of the lower bar 5. With such movement progressing until the upper end of the lower pipe section 7 approaches the upper end of the lower bar 5, the engaging pin 29 provided in the upper pipe section 8 abuts against the inclined guide surface 13f on the transverse bar 13, with the result that the engaging pin 29 is automatically pushed into the lower pipe section 7, thus enabling the upper pipe section 8 to slide inside the lower pipe section 7. As the handle 21 is further pushed down, most of each upper pipe section 8 is inserted in the associated lower pipe section 7, whereby the state shown in phantom lines in FIGS. 1 and 2 is obtained. Further, when the baggage support 1 is turned around the axis of the rotary shaft 4a in a counterclockwise direction as viewed in FIG. 2, the baggage support 1 is folded to extend along the handle bars 3, as shown in phantom lines in FIG. 2. In this manner the handcart can be brought into a very compact form shown in phantom lines in FIG. 2.

Reversely, when it is desired to restore the handcart to its normal working state, first, the baggage support 1 is turned until it is perpendicular to the handle bars 3. Then gripping the handle 21 by one or both hands, the operator pulls it up. In response thereto, the upper pipe sections 8 are pulled out of the lower pipe sections 7 and engaging pins 29 of the upper pipe sections 8 engage the throughgoing holes 7e of the lower pipe section 7, thereby holding the lower and upper pipe sections 7 and 8 in the fully extended state. Further, the lower pipe sections 7 are pulled out of the lower bars 5. At this time, the pawl 18 of the lower pipe 7 is upwardly moved while moving the engaging portion 17c to the right as viewed in FIG. 9 with the inclined guide surface 18c of said pawl 18 abutting against the now-projecting engaging portion 17c. After the front end of the engaging portion 17c comes in temporary contact with the vertical surface 18d of the pawl 18, the engaging portion 17c is aligned with the engaging hole 18b, whereupon the engaging portion 17c instantaneously engages the engaging holes 18b under the action of the spring 14. In this manner the lower pipe sections 7 are fixed in the state in which they are withdrawn from the lower bars 5, with the handle bars 3 assuming the fully extended state shown in FIGS. 1 to 3; thus, the handcart is now in its normal working state.

The first described operation of the handcart is simple enough to enable a single operator to perform all operational steps by using one hand and one foot.

In addition, in the aforesaid illustrated embodiment, each upper bar 6 comprises the lower and upper pipe sections 7 and 8 which are adapted to be extended and contracted as desired in a telescopic manner. However, such upper bar may be a unitary bar.

Figure 10:
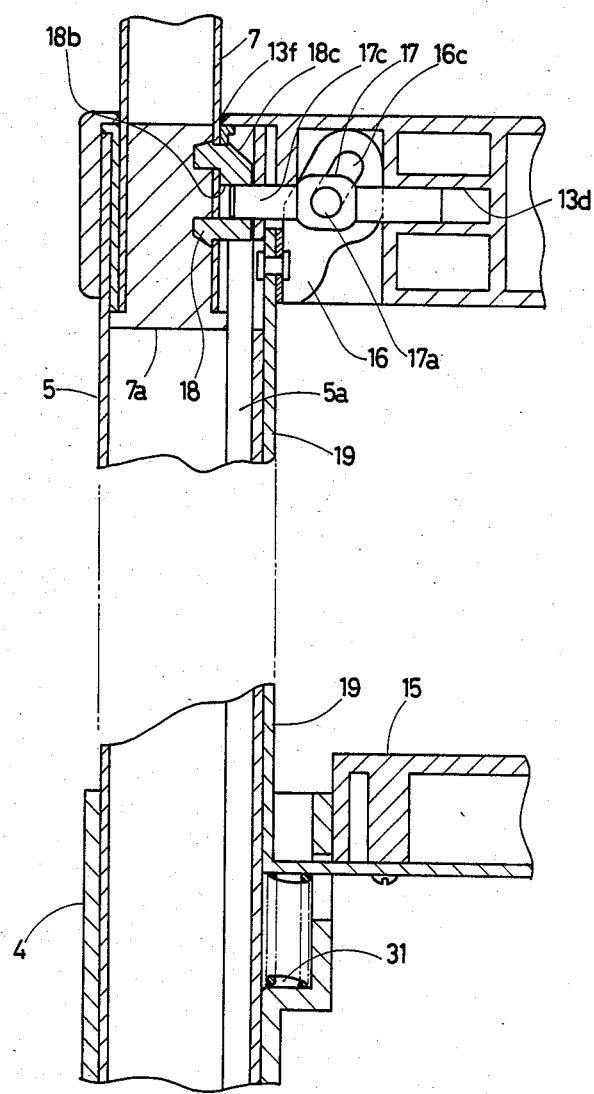
FIG. 10 shows a portion corresponding to that shown in FIG. 6, illustrating another embodiment of this invention.

Further, in the aforesaid embodiment, the guide hole 16c provided in the guide member 16 is in the form of a triangle. However, as shown in FIG. 10, the guide hole 16c may be an elongated opening extending from the upper right to the lower left. In this case, since the engaging pins 17 can be positively moved in response to the upward and downward movements of the guide members 16 caused by the upward and downward movements of the treadle 15, the springs 14 used in the aforesaid embodiment become unnecessary.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A handcart comprising: a baggage support having wheels; right and left handle bars attached to opposite sides of said baggage support, each handle bar comprising a lower bar and an upper bar longitudinally slidable and having a portion overlapping said lower bar, the slide movement between the upper and lower bars enabling the handle bars to be extended and contracted in a telescoping manner; engaging means for selectively inhibiting the slide movement between the lower and upper bars in the fully extended state of the handle bars, said engaging means being positioned in the upper end portion of each lower bar where the lower bar overlaps the lower end portion of the upper bar in said fully extended state; spring means for imparting an engaging motion to said engaging means; operating means positioned adjacent the lower end of said lower bar for imparting a disengaging motion to said engaging means against the resiliency of said spring; interlocking means for operatively connecting said operating means and said engaging means, wherein each of said lower bars comprises a pipe capable of slidably holding the associated upper bar in said telescopic manner, said engaging means comprising an engaging pin adapted to come in and out of the lower bar through a throughgoing hole formed in the lateral wall of the upper end portion of each of said pipes forming said lower bars, and a pawl positioned at the lower end of each of said upper bars and engageable with said engaging pin, a transverse bar connected between the upper ends of said lower bars, and wherein said engaging pins are housed in said transverse bar.

2. The handcart of claim 1, wherein said operating means comprise a single treadle disposed between the lower ends of said lower bars.

3. The handcart of claim 2, wherein said treadle is movable in the direction of the length of said lower bars.

4. The handcart of claim 3, wherein said interlocking means comprises a connecting member fixed to an end of said treadle and movable with said treadle in the direction of the length of said lower bars and extending along the associated lower bar from the lower to the upper end of said lower bars, and a guide member connected to the upper end of said connecting member and movable with said connecting member and adapted to urge said engaging pin out of said lower bar in response to the downward movement of said treadle while engaging said engaging pin.

5. The handcart of claim 4, wherein said spring means is attached to act directly on said engaging pin, said handcart further comprising second spring means for constantly upwardly urging said treadle.

6. The handcart of claim 4, wherein said guide member is adapted to move said engaging pin into and out of said lower bar in response to the upward and downward movements of said treadle, respectively.

7. The handcart of claim 6, wherein said spring means is connected to said treadle for constantly urging said treadle into a biased position.

8. The handcart of claim 1, wherein each of said upper bars comprises a plurality of pipe sections adapted for telescopic extension and contraction, said pipe sections being selectively fixable in their fully extended state.

9. The handcart of claim 1, wherein said handle bars are turnably attached to said baggage support, whereby the latter can be folded to extend along said handle bars.

10. A handcart comprising: a baggage support having wheels; right and left handle bars attached to opposite sides of said baggage support, each handle bar comprising a lower bar and an upper bar longitudinally slidable and having a portion overlapping said lower bar, the slide movement between the upper and lower bars enabling the handle bars to be extended and contracted in a telescoping manner; engaging means for selectively inhibiting the slide movement between the lower and upper bars in the fully extended state of the handle bars, said engaging means being positioned in the upper end portion of each lower bar where the lower bar overlaps the lower end portion of the upper bar in said fully extended state; spring means for imparting an engaging motion to said engaging means; operating; means positioned adjacent the lower end of said lower bar for imparting a disengaging motion to said engaging means against the resiliency of said spring; interlocking means for operatively connecting said operating means and said engaging means, wherein each of said lower bars comprises a pipe capable of slidably holding the associated upper bar in said telescopic manner, said engaging means comprising an engaging pin adapted to come in and out of the lower bar through a throughgoing hole formed in the lateral wall of the upper end portion of each of said pipes forming said lower bars, and a pawl positioned at the lower end of each of said upper bars for engagement with said engaging pin, and wherein said operating means comprise a single treadle disposed between the lower ends of said lower bars for operating said engaging means.

* * * * *